United States Patent Office 2,980,506
Patented Apr. 18, 1961

2,980,506

NITROGEN-PHOSPHORIC ACID COMPOUNDS CONTAINING ACTIVE CHLORINE

Valentin Habernickel, Dusseldorf, and Alfred Köster, Dusseldorf-Oberkassel, Germany, assignors to Henkel & Cie, G.m.b.H., Dusseldorf-Holthausen, Germany, a corporation of Germany No Drawing. Filed Sept. 16, 1957, Ser. No. 683,961

Claims priority, application Germany Sept. 27, 1956

11 Claims. (Cl. 23—85)

This invention relates to and has as its object the production of novel nitrogen-phosphoric acid compounds with at least one amido group which contain active chlorine and which have been found to constitute highly valuable additives of detergents, cleaning agents and disinfectants, having combined water softening and bleaching properties.

The novel nitrogen-phosphoric acid compounds containing active chlorine may be produced in accordance with the invention by chlorinating nitrogen-phosphoric acid compounds which contain at least one amido group using the conventional chlorination methods.

As starting nitrogen-phosphoric acid compounds, in accordance with the invention, there particularly come into consideration the nitrogen-phosphoric acid compounds which are obtained by reaction of phosphorus pentoxide or phosphoric acid with ammonia, urea or ammonium carbamate. These nitrogen-phosphoric acid compounds with at least one amido group have been repeatedly described in the literature of the art but their exact constitution and structural formula is not yet fully known. These nitrogen-phosphoric acid compounds may additionally be produced by reacting phosphorus pentoxide with an ammonium salt in a molar ratio of phosphorous to nitrogen of 1:1.25–3 as described in copending application Serial No. 628,986, filed December 18, 1956, now Patent No. 2,906,601. The starting ammonium salts which may be used in accordance with the said application include ammonium bicarbonate, ammonium carbonate, ammonium acetate, ammonium chloride and mixtures thereof. The salts are preferably anhyrous, but may contain water of crystallization and the reaction is effected by simply contacting the phosphorous pentoxide with the ammonium salt with a molar ratio phosphorus to nitrogen as specified, or preferably 1:1.4–2.5.

In addition to these nitrogen-phosphoric acid compounds, compounds such as disodiummonoamidophosphate and sodium diamidophosphate are also suitable as starting compounds in accordance with the invention.

The chlorination may be effected in the conventional manner with the use of gaseous chlorine, hydrochlorous acid, hypochlorite, N-chlorosuccinimide or other known chlorinating agents. The chlorination may be effected with the starting compound in an aqueous, preferably neutral or alkaline solution as well as in suspension in an inert solvent, as, for example, in chloroform, carbon tetrachloride, or other chlorinated hydrocarbons. In general, however, it is preferable to operate in aqueous solutions, in which connection it has been found particularly advantageous to effect the chlorination at a pH between 8 and 12. This may be achieved in the simplest manner by either operating with alkaline hypochlorite solution or by adding to the solution an amount of alkali or alkaline buffer material necessary to form the desired pH.

It has furthermore been found preferable to effect the chlorination at temperatures between about 0 and 30° C., since the highest degree of conversion is obtained at these temperatures.

The chlorination, in accordance with the invention, may be carried out, for example, by dissolving the starting nitrogen-phosphoric acid compound in water and adding a sodium hypochlorite solution while vigorously stirring. The temperature of the solution should be maintained between about 0 and 30° C. by cooling the solution. Purification can be effected by concentrating the solution which contains the reaction product in vacuum and then causing the nitrogen-phosphoric acid compound which contains the active chlorine to precipitate by the addition of alcohol. The chlorinated nitrogen-phosphoric acid compounds with at least one amido group obtained as above described contain always at least one of the following groups:

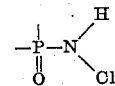

or

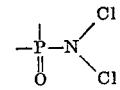

The amount of active chlorine of the products in accordance with the invention may be in the range of 10–70%, preferably 10–50%.

The chlorinated nitrogen-phosphoric acid compounds with at least one amido group, in accordance with the invention, which contain the active chlorine, have a water softening and thus wash activating properties combined with a bleaching effect which distinguishes them from the known compounds which contain active chlorine. The compounds are excellently suited as additives for detergents, cleaning agents and disinfectants.

The following examples are given by way of illustration and not limitation:

*Example 1*

To a solution of 1 part disodium-monoamidophosphate in 3 parts of water, there are added at 0° C. while stirring vigorously 3 parts of a sodium hypochlorite solution with 145 grams active chlorine per liter over the course of 30 minutes. After the completion of the reaction, the slightly yellow solution was reduced to one-quarter of its initial volume by concentration under vacuum and treated with excess alcohol and the crystalline compound which precipitated was removed from the mother liquor. After drying in air or in vacuum, there is obtained a powdered, easily soluble product containing 22% active chlorine. The yield is about 60%. By further working up of the mother liquor (concentration) the yield can be increased to 85%.

*Example 2*

An aqueous suspension which contains 120 grams calcium hydroxide and 140 grams of an amido group containing condensation product from ammonia and phosphorus pentoxide (N:P ratio=1:0.7) per liter, is treated at 5 to 15° C. with 0.8 gram of chlorine gas per minute per liter for 2 hours. After washing thoroughly with a small amount of ice water, there is obtained a clear yellow product containing 14% active chlorine.

*Example 3*

50 parts of a condensation product in accordance with Example 2 are suspended in 3 times its quantity of $CCl_4$. The suspension is treated with 2 parts of calcium hydroxide, and chlorinated for 3 hours with a quantity of chlorine of 0.6 gram per liter per minute. After the suspension medium has been drawn off by suction, the residue is washed with a small amount of ice-water and dried in air. The N-chlorine-nitrogen-phosphoric acid compound contains 11% active chlorine.

*Example 4*

A nitrogen-phosphoric acid compound obtained by reacting of 142 grams of phosphorus pentoxide and 316 grams of ammonium bicarbonate, is chlorinated as described in Example 2. It is obtained a N-chlorine-nitrogen phosphoric acid compound with analogous qualities as the product, which is described in Example 2.

*Example 5*

A solution of 50 parts disodium-monoamidophosphate in 80 parts of water is treated by stirring at a temperature from 0–10° C. with a strong stream of chlorine for about 5 hours with a quantity of chlorine of 0.85 gram per liter and per minute. The so obtained yellow solution was reduced to one-tenth of its initial volume by concentration under vacuum and cooled overnight at −10° C. There are obtained 22 parts of a yellow crystalline product, which contain 42.3% active chlorine. The amount of the active chlorine of the product, obtained as above described, is after six month more than 39%.

*Example 6*

A washing agent of excellent bleaching and disinfecting qualities is obtained by preparing a 1% aqueous solution of a mixture of the following composition:

| | Percent by weight |
|---|---|
| Fatty alcohol sulfonate | 8 |
| Alkyl benzene sulfonate | 12 |
| Magnesium sulfate | 2 |
| Sodium sulfate | 38 |
| Fatty acid ethanolamide | 2 |
| Waterglass (mol ratio: $SiO_2:Na_2O=3.25:1$) | 8 |
| Chlorinated nitrogen-phosphoric compound as described in Example 3 | 20 |
| Water | balance |

We claim:

1. Process for the preparation of a nitrogen-phosphoric acid compound containing an active chlorine connected directly to an amido group which comprises chlorinating a nitrogen-phosphoric acid compound having at least one amido group which is obtained by the reaction of a member selected from the group consisting of phosphorus pentoxide and phosphoric acid with a member selected from the group consisting of ammonia, urea, ammonia salts and ammonium carbamate, with a member selected from the group consisting of gaseous chlorine, hypochlorous acid, hypocholrites and N-chloro-succinimide.

2. Process according to claim 1 wherein an inert organic solvent is used.

3. Process for the preparation of a chloramine having an active chlorine connected directly to an amido group which comprises chlorinating disodium-monoamidophosphate with a member selected from the group consisting of gaseous chlorine, hypochlorous acid, hypochlorites and N-chloro-succinimide.

4. Process for the preparation of a chloramine having an active chlorine connected directly to an amido group which comprises chlorinating sodium-diamido-phosphate with a member selected from the group consisting of gaseous chlorine, hypochlorous acid, hypochlorites and N-chloro-succinimide.

5. Process according to claim 1 in which said chlorination is effected at a pH between about 7 and 12.

6. Process according to claim 1 in which said chlorination is effected at a temperature between about 0 and 30° C.

7. Process according to claim 1 in which said chlorination is effected with a sodium hypochlorite solution.

8. Process according to claim 1 in which said chlorination is effected with chlorine gas in the presence of calcium hydroxide.

9. Process for the preparation of a chloramine from disodium-monoamido phosphate having an active chlorine connected directly to an amido group which comprises adding sodium hypochlorite to an aqueous solution of disodium monoamido phosphate at 0° C. and precipitating said chloramine by addition of ethanol.

10. Process for the preparation of a chloramine from disodium monoamidophosphate, having an active chlorine connected directly to an amido group which comprises passing a strong stream of chlorine at 0°–10° C. through a solution of said disodium monoamidophosphate, and precipitating said chloramine by cooling.

11. A chloramine obtained by chlorinating, with a member selected from the group consisting of gaseous chlorine, hypochlorous acid, hypochlorites and N-chloro-succinimide, a compound selected from the group consisting of disodium-monoamido-phosphate, sodium-diamido-phosphate and a nitrogen-phosphoric acid compound having at least one amido group which is obtained by the reaction of a member selected from the group consisting of phosphorus pentoxide and phosphoric acid with a member selected from the group consisting of ammonia, urea, ammonia salts and ammonium carbamate, said chloramine containing at least one grouping

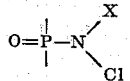

in which X is a member selected from the group consisting of chlorine and hydrogen.

References Cited in the file of this patent

UNITED STATES PATENTS

| 1,555,474 | Mathias | Sept. 29, 1925 |
| 1,854,291 | Burdick | Apr. 19, 1932 |
| 2,350,850 | Watzel | June 6, 1944 |
| 2,582,181 | Truhlar et al. | Jan. 8, 1952 |
| 2,738,265 | Nielsson | Mar. 13, 1956 |
| 2,746,855 | Ruosch | May 22, 1956 |
| 2,788,286 | Teja et al. | Apr. 9, 1957 |
| 2,796,321 | Taylor | June 18, 1957 |

OTHER REFERENCES

Chemical Society Journal of London, Gladstone, vol. 7, 1869, pages 16–22.